C. F. HULTGREN.
ANTISKIDDING SANDING DEVICE.
APPLICATION FILED MAY 29, 1912.
1,052,822.
Patented Feb. 11, 1913.
3 SHEETS—SHEET 1.
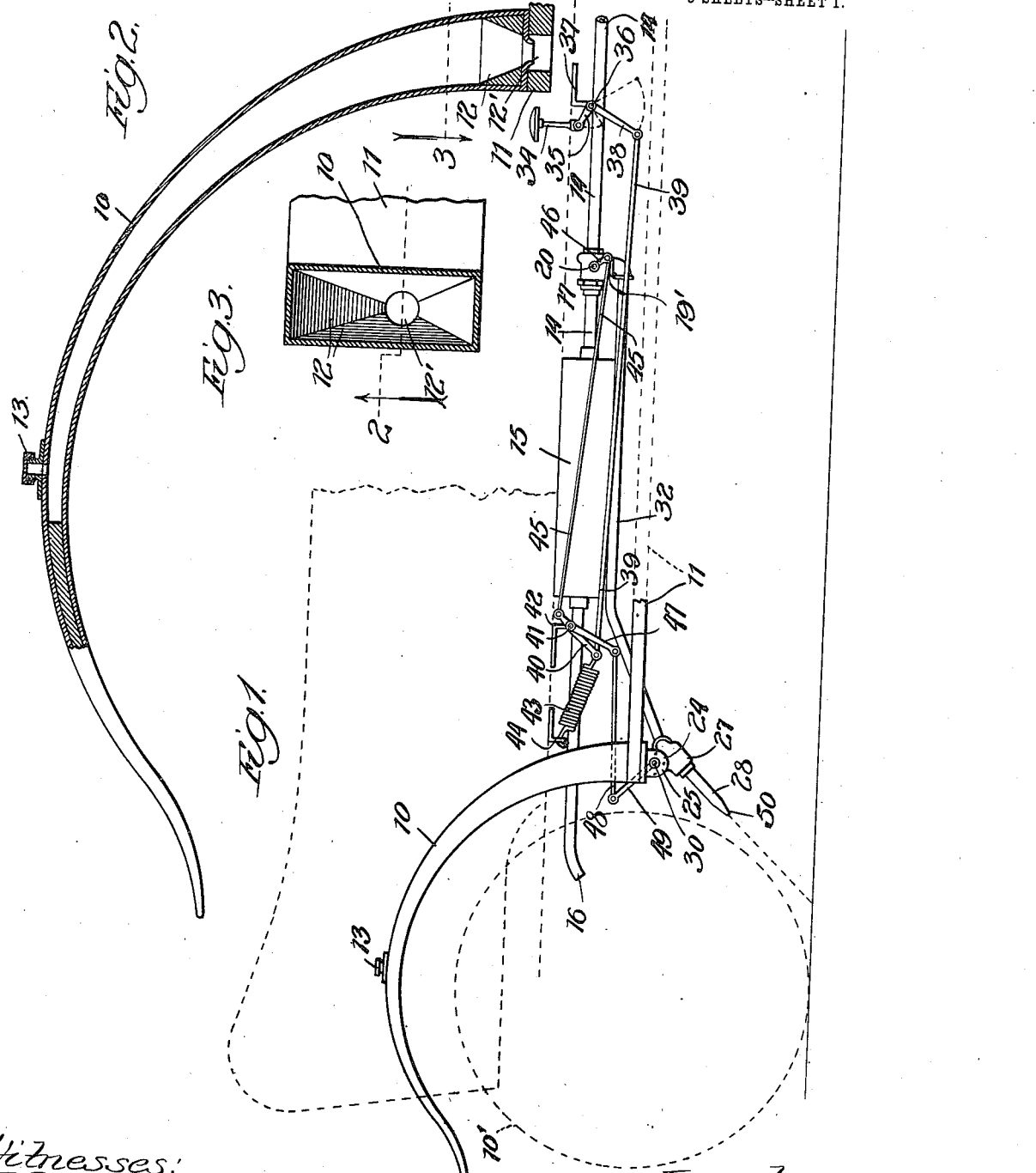
Witnesses:
Inventor:
Charles F. Hultgren,

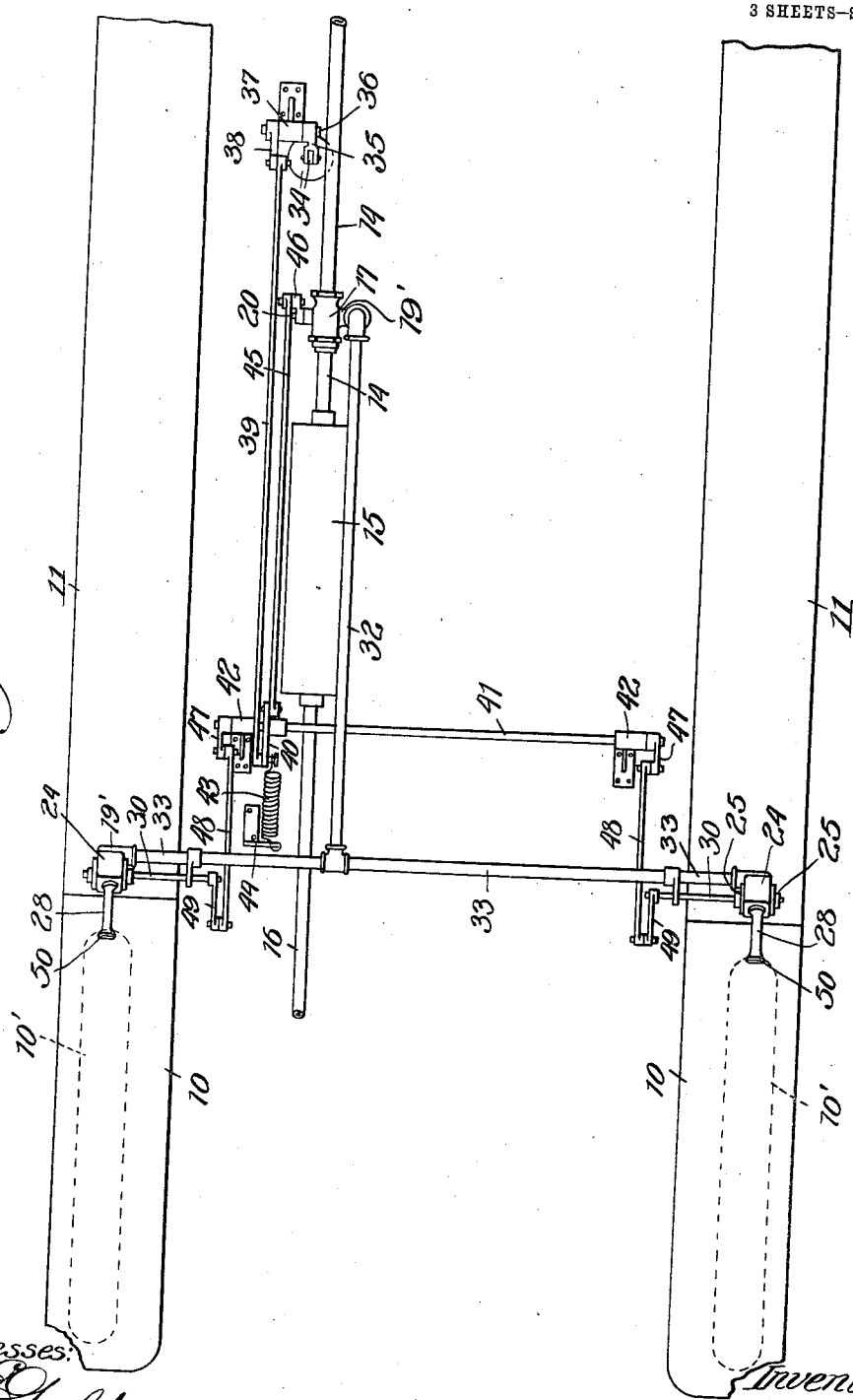

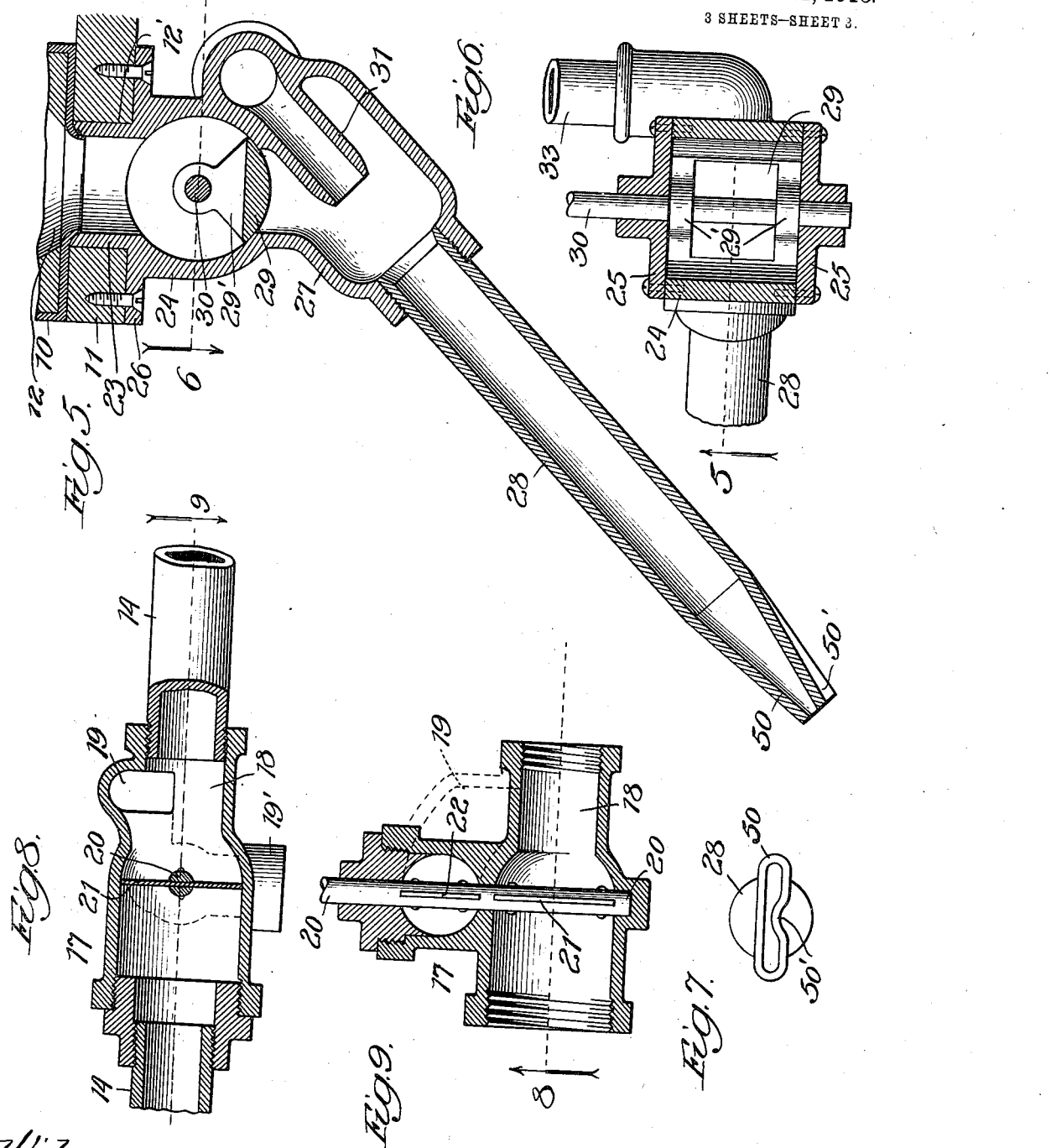

UNITED STATES PATENT OFFICE.

CHARLES F. HULTGREN, OF CHICAGO, ILLINOIS.

ANTISKIDDING SANDING DEVICE.

1,052,822.   Specification of Letters Patent.   Patented Feb. 11, 1913.

Application filed May 29, 1912. Serial No. 700,331.

*To all whom it may concern:*

Be it known that I, CHARLES F. HULTGREN, a citizen of the United States, residing at Chicago, in the county of Cook and State of Illinois, have invented a new and useful Improvement in Antiskidding Sanding Devices, of which the following is a specification.

My invention relates to an improvement in the class of devices for throwing, at will sand, for its anti-skidding purpose, into the path of the wheels of an automobile, street-car, locomotive, and the like.

In its operation my improved device employs the pressure of the exhaust from the engine of the vehicle equipped with it to act on the ejector-principle for spraying the sand, from a valved supply-holder on the vehicle, into the path of the wheels.
In the accompanying drawings, Figure 1 is a broken view showing my improved device in side elevation as applied to an automobile represented by dotted lines; Fig 2 is an enlarged broken and sectional view of one of the two similar mud-guards, showing its construction to afford a sand-holder; Fig. 3 is a section on line 3, Fig. 2; Fig. 4 is a bottom view of Fig. 1; Fig. 5 is an enlarged sectional view of the valve-device controlling the discharge of sand from a supply-holder and the ejector-device coöperating therewith; Fig. 6 is a broken view of a section on line 6, Fig. 5; Fig. 7 is an end view of the discharge-nozzle of the ejector-device; Fig. 8 is a broken view of a section on line 8, Fig. 9, showing the valve-mechanism for controlling the course of the engine-exhaust to the ejector-device and the atmosphere through the muffler, and Fig. 9 is a section on line 9, Fig. 8.

The drawings illustrate my improvement, and the following description is confined thereto, in its application to an automobile, for which I have more especially devised it, though it is equally applicable, in its principal features, to any vehicle equipped with an engine driven by fluid pressure.

An automobile is represented mainly by dotted lines in Fig. 1, with similar mud-guards 10 extending from the running-boards 11 over the rear wheels $10^1$. Each mud-guard is hollow to form a reservoir or holder for the supply of sand to be used, and has a hopper-shaped discharge-outlet 12 leading through the respective running-board, and a stoppered filling-opening 13 near the highest point on its upper side.

The exhaust-pipe 14 of the internal-combustion engine (not shown) of the automobile leads to a muffler 15 provided with a discharge-pipe 16. In the pipe 14 is interposed a valve-device 17 of the construction best shown in Figs. 8 and 9. The casing of this valve-device contains a passage 18 in direct line with the exhaust-pipe, and is formed with a branch-passage 19, the discharge-end of which extends transversely of the passage 18. A horizontal valve-stem 20 is journaled in the casing to extend across the passages 18 and 19 and carries in the former a disk or damper-like valve 21, and in the latter a similar, but smaller, valve 22 set to extend in alinement with the valve 21, whereby when one is opened the other is closed.

To the lower end of each chambered mud-guard is fastened the combined sand-valve and ejector-device, the construction of which is best shown in Fig. 5. It comprises a thimble 23 on a cylindrical casing 24 closed by heads 25 on its opposite ends, the thimble fitting in the running-board opening $12^1$ with which the hopper-outlet 12 registers, a flange 26 extending from the casing-sides, through which to fasten the device in place against the under side of the running-board; and the casing has a lower rearwardly-inclined extension 27 with a nozzle 28 extending from it to incline downwardly adjacent to and in line with a rear wheel $10^1$ to discharge in the path of the latter. The junction of the casing 24 and extension 27 forms a seat for a valve 29, of segmental shape in cross-section and provided on its ends with arms $29^1$ secured on a stem 30 journaled centrally in the heads 25. In the casing-section 27 is formed the ejector-tube 31 to aline with the nozzle 28; and that section is connected at a nipple $19^1$ on the valve-device 17 with the branch-passage 19 by a pipe 32, which is coupled at its rear end to a transverse pipe 33 connecting the tubes 31 of the two combined valve and ejector-devices.

A treadle 34, located in front of the driver's seat (not shown) is supported on a crank-arm 35 secured to one end of a rock-shaft 36 journaled in a bracket 37 and carrying on its opposite end a crank-arm 38 having a rod-connection 39 with one end of a cross-head 40 on a rock-shaft 41 journaled in bearings 42, 42 to extend parallel with the pipe 33. That end of the cross-head is connected by a spiral spring 43 with a bracket 44, and its opposite end is connected by a rod 45 with a crank-arm 46 on the valve-stem 20, the spring 43 thus holding the valve 22 normally closed and the valve 21 normally open. On each end of the rock-shaft 41 is a crank-arm 47 having a link-connection 48 with a crank-arm 49 on the respective valve-stem 30.

With the parts in the relative normal positions in which they are illustrated, depression of the treadle 34 turns the rock-shaft 36 to draw forwardly on the rod 39 against the resistance of the spring 43 and thereby turn the cross-head 40 to draw rearwardly the rod 45 and turn the stem 20 to open the valve 22 and close the valve 21 to the exhaust-pipe 14, thereby directing the exhaust-gases from the engine through the pipe 32 into the pipe 33 and thence into the ejector-tubes 31. By the same depression of the treadle, turning the shaft 41 actuates the crank-arms 47, by pulling forwardly on the links 48 and crank-arms 49, to rotate the valve-stems 30 in the direction to turn the valves 29 off their seats and thus open the passages 12 from the holders 10 through the casings 24 into their extensions 27. Sand in the holders 10, which thus feeds by gravity past the valves 29, is drawn by the ejector-action of the exhaust-pressure through the tubes 31 into the paths of pressure which forcibly discharges the sand through the nozzles 28 into the paths of the wheels $10^1$. Upon releasing the treadle from depression, the spring 43 restores the parts to their normal relative positions.

The discharge-end of each nozzle 28 is preferably flattened, as represented at 50 in Fig. 7, and raised at $50^1$ between the ends of its lower side to constrict it, thereby to overcome the tendency to central discharge of the sand in a stream and diffuse it to produce a sheet-like discharge thereof.

By means of my improved sanding-device, the pressure of the exhaust from the engine is utilized to perform all the work of spraying the sand without causing any back-pressure on the engine; the valves are quickly responsive to the action of the pedal and spring 43, those controlling the sand-discharge from the holders 10 and the shunting of the exhaust through the branch-passage 19 acting simultaneously in opening and closing; and when used on an automobile, enabling the mud-guards to form the sand-holders, the provision of special means for the purpose and consequent encumbering of the machine are avoided.

I realize that considerable variation is possible in the details of construction thus specifically shown and described, and I do not intend, by illustrating a single, specific or preferred form, to limit my invention thereto; my intention being in the following claims to claim protection upon all the novelty there may be in the device as broadly as the state of the art will permit.

What I claim as new and desire to secure by Letters Patent is—

1. A wheeled engine-driven vehicle provided with a sanding-device comprising, in combination, an engine-exhaust pipe, a valve-device in said pipe having a valved passage normally open to said pipe and a valved branch-passage normally closed thereto, a sand-holder, a valve normally closing the discharge from said holder, an ejector-device coöperating with said valve and communicating with said branch-passage, and means for opening the valve in said branch-passage and said sand-discharge controlling-valve and closing the valve in said passage.

2. A wheeled engine-driven vehicle provided with a sanding-device comprising, in combination, an engine-exhaust pipe, a valve-device in said pipe having a valved passage normally open to said pipe and a valved branch-passage normally closed thereto, a sand-holder, a valve-device normally closing the discharge from said holder and having a casing provided with an extension, a discharge-nozzle on said extension and an ejector-tube therein alining with said nozzle and projecting in the path of sand-discharge past the controlling valve therefor; said tube communicating with said branch-passage, and means for simultaneously opening the valve in said branch-passage and said discharge-controlling valve and closing the valve in said passage.

3. A wheeled engine-driven vehicle provided with a sanding-device comprising, in combination, an engine-exhaust pipe, a valve-device in said pipe having a valved passage normally open to said pipe and a valved branch-passage normally closed thereto, a sand-holder, a valve normally closing the discharge from said holder, an ejector-device coöperating with said valve and communicating with said branch-passage, said ejector-device having a discharge-nozzle provided with a flattened and constricted discharge-end, and means for opening the valve in said branch-passage and said sand-discharge controlling-valve and closing the valve in said passage.

4. A wheeled engine-driven vehicle provided with a sanding-device comprising, in combination, an engine-exhaust pipe, a valve-device having a casing forming a passage interposed in said pipe and provided with a branch-passage, a valve-stem journaled in the casing and carrying a valve normally opening said passage and a valve normally closing said branch-passage, a sand-holder, a valve normally closing the discharge from said holder, an ejector-device coöperating with said discharge-controlling valve and communicating with said branch-passage, means connecting said stem and discharge-controlling valve to actuate them together, and a device connected with said means for operating them.

5. An automobile provided with a sanding-device comprising, in combination, sand-holders provided with discharge-outlets in their lower ends, an engine-exhaust pipe, a valve-device in said pipe having a valved passage normally open to said pipe and a valved branch-passage normally closed thereto, a combined sand-valve and ejector-device on the discharge-end of each sand-holder, having a casing provided with an extension and a valve-seat between them, a valve normally against said seat, a discharge-nozzle on the extension and an ejector-tube in the extension alining with said nozzle, a cross-pipe connecting the two ejector-tubes, a pipe connecting said branch-passage with said cross-pipe, and means for simultaneously opening the valve in said branch-passage and said sand-valves and closing the valve in said passage.

6. An automobile provided with a sanding-device comprising, in combination, sand-holders provided with discharge-outlets in their lower ends, an engine-exhaust pipe, a valve-device in said pipe having a valved passage normally open to said pipe and a valved branch-passage normally closed thereto, the valves for said passages being on a common stem, valves normally closing said discharge-outlets, ejector-devices coöperating with said last-named valves, a cross-pipe connecting said ejector-devices, a pipe connecting said branch-passage with said cross-pipe, a spring-pressed rock-shaft having rod and crank connections at its ends with the stems of said discharge-outlet valves, a cross-head on said shaft having a rod and crank connection with said common valve-stem, a treadle, and a rod and crank connection between said cross-head and treadle.

CHARLES F. HULTGREN.

In presence of—
L. HEISLAR,
R. SCHAEFER.